United States Patent [19]

Samulski

[11] 4,245,507
[45] Jan. 20, 1981

[54] TEMPERATURE PROBE

[76] Inventor: Thaddeus V. Samulski, 4013 Stilwell St., Pittsburgh, Pa. 15214

[21] Appl. No.: 73,841

[22] Filed: Sep. 10, 1979

[51] Int. Cl.$^3$ ............................................. G01K 11/20
[52] U.S. Cl. ....................................... 73/356; 356/44;
250/337
[58] Field of Search ............. 73/356, 355 R, 355 EM;
356/44, 45, 43

[56] References Cited

U.S. PATENT DOCUMENTS

| | | | |
|---|---|---|---|
| 3,533,399 | 10/1970 | Goldberg | 73/756 |
| 3,591,810 | 7/1971 | Jackson | 73/756 |
| 3,720,623 | 3/1973 | Cartmell et al. | 252/316 |
| 3,789,667 | 2/1974 | Porter et al. | 73/731 |
| 3,883,748 | 5/1975 | Nada et al. | 250/484 |
| 4,016,761 | 4/1977 | Rozzell | 73/356 |
| 4,136,566 | 1/1979 | Christensen | 73/356 |
| 4,140,393 | 2/1979 | Cetas | 356/44 |
| 4,151,747 | 5/1979 | Gottlieb et al. | 73/356 |
| 4,179,927 | 12/1979 | Saaski | 73/356 |

Primary Examiner—Donald O. Woodiel
Attorney, Agent, or Firm—William A. Danchuk

[57] ABSTRACT

A temperature probe measures temperature changes within biological material while the tissue is being irradiated with microwaves. In order to measure tissue temperatures accurately a probe must be designed to function in a microwave field while causing minimum perturbation to the microwave field. This generally requires a probe being constructed of dielectric (nonmetallic) material which utilizes physical phenomena which are thermally dependent yet unaffected by electromagnetic fields at the field strength and frequencies of interest. In one embodiment the structure of the probe basically includes an optical fiber bundle for conducting light both toward and away from a temperature sensitive luminescent element located at one end of the optical fiber bundle, the source for exciting the temperature sensitive element and a light responsive detection element located at the output end of the optical fiber bundle for detecting light emitted from the temperature sensitive element which is temperature dependent. The light received by the light responsive detection element can be analyzed with regard to several parameters (intensity, frequency and phase) and thereby used for indicating the temperature of the biological sample or tissue.

24 Claims, 4 Drawing Figures

TEMPERATURE PROBE

BACKGROUND OF THE INVENTION

The field of temperature measurement includes a variety of conventional temperature sensing devices which involve metallic sensors and elements such as thermisters, thermocouples and thermometers. Calorimetric techniques may also be employed for temperature measurement. However, each of these conventional temperature measuring devices is handicapped when used to measure temperature changes of biological tissue in the presence of an electromagnetic field. The metallic elements of the conventional temperature measuring sensors cause interferences and perturbations and concentrations of the electromagnetic field in which it is placed which result in erroneous readings and undesirable, localized hot spots in the biological tissue being measured. Calorimetric methods require that the tissue be enclosed in a container while further restricting the temperature measurements until after the material being sensed in irradiated.

Medical research has been hampered in the past by the absence of a non-perturbating and interfering temperature sensor. Science has had to resort to complicated methods and expensive elements which are used to sense the temperature of the biological tissue while the same is in an electromagnetic field such as microwave radiation.

One example of a successful attempt to produce a temperature probe having non-perturbing elements which may be used to measure the biologicl tissue while the tissue is subject to an electromagnetic field is that shown in the patent to Rozzell, et al. U.S. Pat. No. 4,016,761. The Rozzell patent utilizes the reflective properties of a liquid crystal at the end of a bundle of optical fibers. While the liquid crystal is non-metallic and does perturb or interfer with the electromagnetic field, it is subject to various disadvantages. For instance, the liquid crystals are subject to chemical instability and must be both kept in an airtight sealed arrangement as well as constantly recalibrated or substituted for new liquid crystals as they deteriorate with time. Moreover, liquid crystals are subject to drift and hysteresis which create problems in the reliability of the instrument. Generally, the sensitivity of optical temperature probes based on reflective phenomena is critically dependent on the physical dimensions and coupling of the temperature sensitive element to the optic fiber bundle. Thus, the sensitive tip of the probe requires careful construction placing limitations on size and durability. The instrument described in the Rozzell, et al. patent serves a very useful purpose and is successful in its partial attempts at temperature measurement. However, the temperature probe described therein does not satisfy all of the requirements demanded by rigorous biological research.

The temperature probe of the present invention goes beyond the apparatus described in the Rozzell patent as well as all optical probes based on reflectivity and has several advantages for reliable and efficient measure of temperature within biological samples in an electromagnetic environment.

SUMMARY OF THE INVENTION

The present invention is addressed to a temperature probe having non-metallic parts and is suitable for the measurement of temperature in an electromagnetic field with specific applications in biological research. The temperature probe is configured having at least one distinct group of optical fibers for conducting light between one end thereof and the other. The probe additionally includes a temperature sensitive element located at one end of the optical fiber bundle, the temperature element having temperature dependent luminescent properties which are extremely relible in sensing the temperature of materials with which the element is in thermal equilibrium, the temperature sensitive element being adapted to be implanted in the material whose temperature is to be measured. The probe of the present invention also includes a source for exciting the luminescent temperature sensitive element and a light responsive detection element located at the other end of the optical fiber bundle from the temperature sensitive element for detecting the light emitted from the temperature sensing element which is passed through the optical fibers. The detection element takes the intensity of the light and/or the frequency and/or lifetime shift characteristic of the luminescent process and uses this information to translate it through conventional electronic systems into a reading of the temperature of the biological tissue. As alluded to previously, the luminescent material or materials used within the end of the probe to be implanted can have a light intensity (quantum efficiency), frequency spectrum and temperature dependent decay or lifetime, one or all of which may be used for temperature detection purposes. Additionally, the frequency of the excitation source which is passed to the luminescent element is not equal to the frequency of the light which is passed out from the temperature sensitive element. In this respect the physical process is not reflective. This difference in frequency may be used as a means for selectively differentiating the output signal from input noise, an advantage in recovering necessary information for the determination of temperature.

The present invention includes a variety of embodiments which have individual sources of light for excitation of the luminescent element as well as one embodiment which includes its own self-contained source (radioactive) for exciting the luminescent material.

Accordingly, it is a general object and feature of the present invention to provide a non-metallic temperature probe for measuring the temperature of a material while the material is in an electromagnetic field without interfering with the electromagnetic field or having its response altered by the electromagnetic field except through thermal interaction.

It is another general object and feature of the present invention to provide a temperature probe adapted to be implanted in a material whose temperature is to be measured having a temperature sensitive element having luminescent and temperature sensitive properties.

It is yet another object and feature of the present invention to provide a temperature probe adapted to be implanted in a material whose temperature is to be measured, the temperature probe including a temperature sensitive element which is adapted to utilize a spectral frequency shift between the adsorbed radiation it receives to excite it and the emitted radiation it passes out in response to the temperature surrounding it.

It is still another object and feature of the present invention to provide a non-metallic temperature probe adapted to be implanted in a material whose temperature is to be measured, the temperature probe including merely a single group of optical fibers which may be used both to conduct excitation light toward the temperature sensitive element as well as to conduct light from the temperature sensitive element to a light responsive detection element, the detection element having means for detecting a change in the time response (luminescent decay or lifetime) of the temperature sensitive element indicative of a temperature change in the material in which the probe is implanted. This time response (decay or lifetime) may be measured directly or via alternate means, e.g., phase sensitive detection technique.

BRIEF DESCRIPTION OF THE DRAWINGS

The novel features that are considered characteristic of the invention are set forth with particularity in the appended claims. The invention itself, however, both as to its structure and its operation together with the additional objects and advantages thereof will best be understood from the following description of several embodiments of the present invention when read in conjunction with the accompanying drawings wherein:

DETAILED DESCRIPTION OF THE INVENTION

Figure 1:
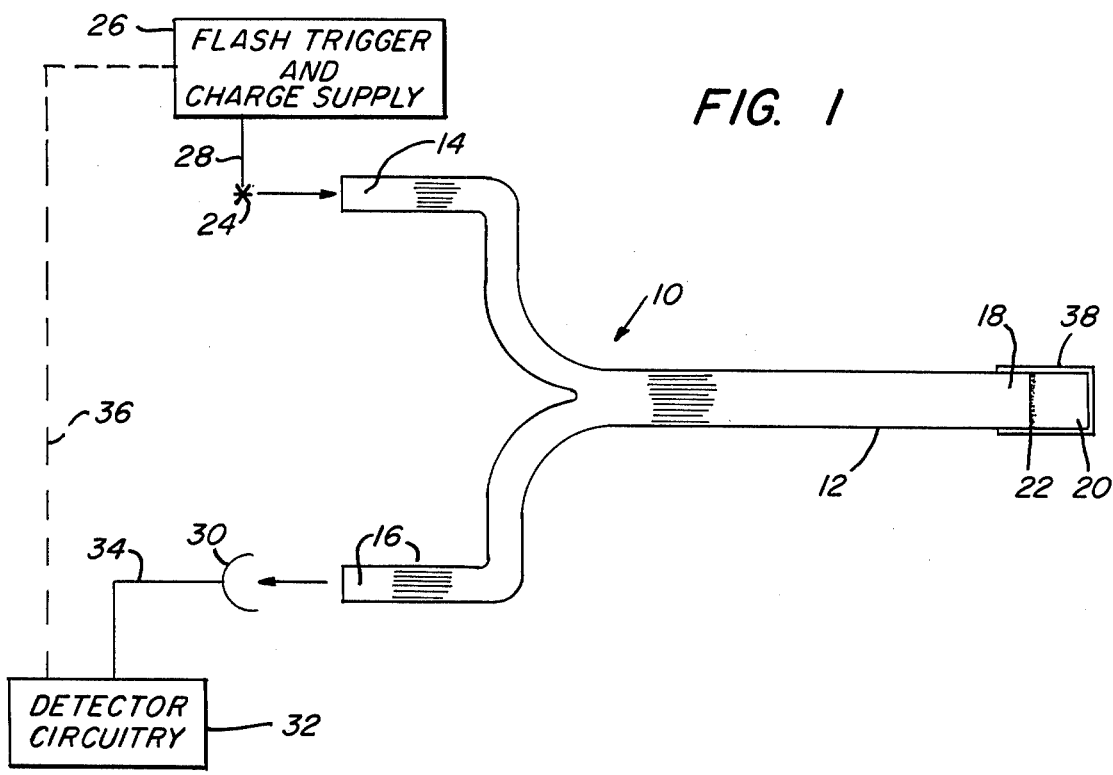
FIG. 1 is a schematic representation of one embodiment of the temperature probe of the present invention having two distinct groups of optical bundles.

Looking to FIG. 1 there is shown in schematic form a temperature probe 10 and the associated mechanisms for operating the same. The probe 10 consists of a bundle of optical fibers 12 having any convenient and reasonably desired diameter, length and number. In the embodiment shown in FIG. 1 the bundle of optical fibers 12 is separated into two distinct groups having terminals at 14 and 16 and a common terminal at 18. Provided adjacent to the terminus of the optical bundle 12 at its end 18 is a temperature sensing element 20 which has luminescent properties. The temperature sensing element 20 may be a fluorescent material or may be a phosphorescent material, or suitable combination of materials. Applicant has found that the temperature sensitive element 20 may take any number of specific embodiments, however, zinc sulfide activated with camdium and calcium sulfide activated with Europium and tin have been found to have suitable temperature sensitive properties in order to demonstrate the operability of this invention. The temperature sensitive element 20 is attached to the end 18 of the optical fiber bundle by a clear epoxy 22 and includes about its periphery an opaque encapsulation of an opaque epoxy. The separated ends of the optical fiber bundles 14 and 16 are also encapsulated in an opaque casing (not shown). Positioned proximate the one end 14 of the optical bundle is a source of excitation radiation 24. The source 24 may take any one of a number of configurations, however, applicant has found that a xenon flash lamp provides sufficient optical excitation levels for the purposes of the present invention. The source 24 is controlled, both as to its triggering and its source of power by a flash trigger and charge supply circuit 26 through an electrical line 28. The specific triggering mechanism and charge supply, as well as the circuitry involved therein, are not unique and are commonly available with state of the art electronics and will not be further discussed herein.

Located proximate the other end 16 of the optical bundle is a light responsive element 30 which is adapted to sense the levels of light or radiation emitted by the temperature sensitive element 20 and passed through the optical bundle toward it. The specific configuration of the light responsive element 30 is one of design. However, applicant has found that a photo multiplier tube or photosensitive diode, commonly available, serves well as a detector of the luminescent radiation passed to it through the optical bundle 16. The circuitry and electronics necessary for receiving the signal from the photo multiplier tube 30 is shown as the detector circuitry 32 and may take any one of a number of configurations which are commonly available in the electronics art. A connection 36 between the detector circuitry 32 and the flash trigger and charge supply circuitry 26 is provided in order to relate the time and intensity of the source 24 to the radiation received by the photo multiplier tube 30 for correlating and analyzing the luminescent light signal received by the detector with regard to temperature determination. The exact nature of the information communicated between source and detector will depend on which characteristic parameter is being measured and the technique used for measuring this parameter.

The use of a luminescent temperature probe provides various advantages over conventional systems. For instance, due to its non-metallic nature and physical process by which it functions it does not perturb or interfere with the electronmagnetic field or microwave radiation to which it is subjected during its temperature measurement function. Additionally, the luminescent material has a definite temperature dependence and may be formed of a relatively small size for delicate biological tissue temperature sensing. In addition to being small, it is easily fabricated and easily attached to the end 18 of the optical fiber bundle. The luminescent materials can have a long term physical and chemical stability without drift or hysteresis associated therewith. As alluded to previously, the luminescent material may be one of a variety of materials depending upon the range and resolution necessary in a given or desired circumstance. Luminescent materials have a luminescent intensity which is directly related to temperature and thereby to the temperature of materials in thermo equilibrium with it. In addition, the luminescent material has a luminescent decay time or lifetime which is temperture dependent. This decay time or lifetime is an intrinsic property of the luminescent material. Consequently, it allows the measurement of an intensive rather than extensive parameter for the purpose of temperature measurements. Specifically, the light which is used to excite the temperature sensitive luminescent element 20 is absorbed by the material. Subsequently, the material 20 is adapted to emit a radiation with a time dependent intensity which is characteristic of the atomic and solid state properties of luminescent material and independent of the intensity of the source used to excite the luminescent material. Thus the time dependence of the emission intensity rather than the intensity itself can be used as a thermo parameter. The time dependence of the emission intensity can be measured directly as a decay time from a single excitation pulse or as a phase shift between a modulated excitation source and the resulting modulated luminescent emission. It should also be noted that the frequency spectrum of the light emitted by the temperture sensitive element 20 is also temperature dependent and may also be used in order to determine the temperature proximate the probe.

Another important aspect of luminescence phenomenon (from a frequency standpoint) is that the emitted radiation is characteristically different from the adsorbed radiation. For example, the emission frequency of the radiation from the temperature sensitive element 20 is different from the adsorption frequency of the light from source 24. In this regard, luminescence phenomenon is not a reflectance effect. It is this difference in the character of the excitation or absorption radiation from the emission radiation which offers an advantage with regard to detection techniques used for luminescent studies. Luminescence is traditionally subscategorized into two processes, i.e., fluorescence and phosphorescence. Fluorescence and phosphorescence are processes in which radiation is emitted by a luminescent material that has been excited via the absorption of specific types of radiation. If the quantum states from which the emission originates and terminates have the same multiplicity, the emission is called fluoroescence and is characterised by a relatively short lifetime ($10^{-2}$ to $10^{-10}$ sec.). If the states from which the emission originates and terminates differ in spin ($\Delta S \geq 1$), the emission is known as phosphorescence and the lifetime can be relatively long ($10^{-3}$ to $10^+$ sec.). The luminescent emission intensity, lifetime and frequency spectrum can be temperature dependent and therefore one or more of these characteristic properties may be used as a thermoresponse parameter. Combined with an optical fiber bundle serving as a light guide for optical excitation as well as a return guide for observing the luminescent response, a luminescent material has the potential for making a relatively small non-electronic non-metallic temperature probe. Such an optically activated luminescent temperature probe can be useful in situations where more conventional type probes (thermisters and thermocouples, etc.) are handicapped due to electrical perturbation and interference, i.e., in an electromagnetic field.

Of the possible techniques available for detecting the luminescent response phase flurometry appears to be one which shows attractiveness. This technique uses a modulated excitation source and detects the phase shift between the modulated excitation source and the consequently modulated luminescent response. Since the phase shift is directly related to the luminescent lifetime, which is temperature dependent, a change in relative phase in the luminescent signal excitation source can be related through known procedures to a change in temperature of the luminescent material located at the probe tip. This type of detection technique will allow the use of phase sensitive lock-in amplification which offers a considerable advantage in recovering a weak luminescent emission signal. The phase detection technique can be independent of excitation source intensity and offers an additional advantage with regard to detection electronics and probe interchangeability.

Figure 2:
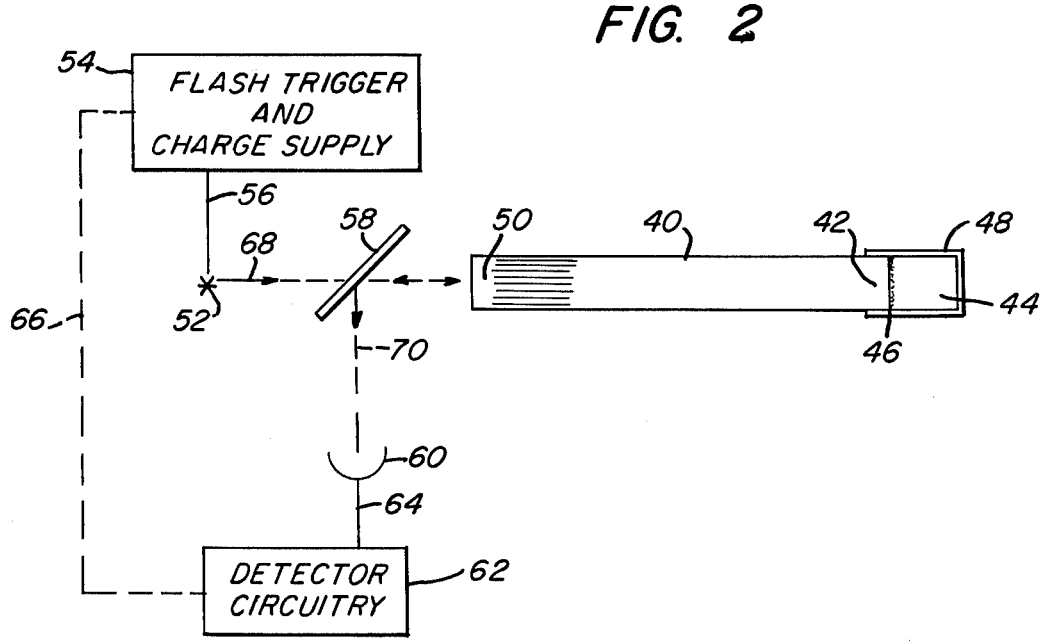
FIG. 2 is a schematic representation of another embodiment of the temperature probe of the present invention having a single group of optical bundle associated therewith.

Looking to FIG. 2 there is shown an alternative embodiment of the present invention, utilizing the temperature dependent parameters (intensity, lifetime, frequency spectrum) previously described. A bundle of optical fibers 40 is provided which is presented in a single group. Provided at one end 42 of the optical bundle is a temperature sensitive element 44. The temperature sensitive element 44 is attached to the end 42 of the optical bundle 40 by a clear epoxy 46. The end of the temperature sensitive element 44 is sheathed or encapsulated in an opaque epoxy material 48 for excluding any ambient or extraneous light from the temperature sensitive element 44. The other end 50 of the optical fiber bundle 40 is located outside and away from the electromagnetic field and has associated with it a source of illumination 52 which may take any one of a number of configurations as previously discussed. The source 52 is triggered and supplied with energy by a flash trigger and charge supply circuit 54 and is connected to the source 52 via electrical line 56. A beam splitter 58 is provided along the optical path between the source of illumination 52 and the end of the optical fiber bundle 50. The beam splitter may take any one of several configurations including those which not only split the beam but additionally filter the inherent characteristics of light such as color, frequency or polarization. Corrugated light wave guides are only one example of such alternatives. The beam splitter is employed for separating the incoming excitation radiation from the outcoming luminescent response radiation from the temperature sensitive element 44. Located proximate beam splitter 58 is another light responsive detector element 60 similar to that described previously which has associated with it its own detector circuitry 62 and is connected to the detector via appropriate electrical line 64. A comparative connection 66 between the flash trigger and charge supply circuitry 54 and the detector circuitry 62 is provided if necessary for comparing the intensity and/or phase differential between the outgoing illumination 68 and the incoming radiation 70. The beam splitter 58 is available in the current state of the art in guided wave optics. It should be noted, however, that the single bundle of optical fibers 40 may be utilized for both incoming as well as outgoing illumination due to the frequency differential properties of the luminescent material 44 used at the end of the probe. Moreover, by modulating the source 52 and measuring the consequent modulated luminescent response to detect a phase shift, which is temperature dependent, a phase change in the luminescent signal can be related to a temperature change.

Figure 3:
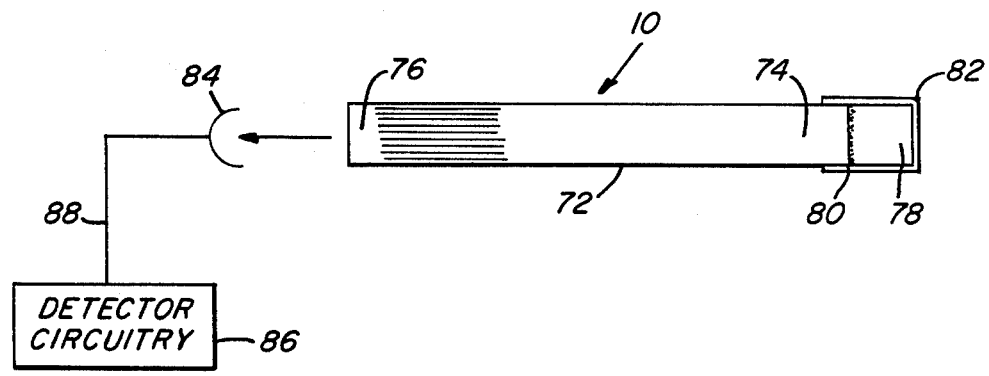
FIG. 3 is another schematic representation of a temperature probe according to the present invention which utilizes a radioactive and luminescent material which is self-exciting and which requires no other external excitation source.

Looking to FIG. 3, there is shown a third embodiment of the present invention. The temperature probe 10 of this third embodiment includes a single bundle of optical fibers 72 having a probe end 74 and a response end 76. Located proximate the probe end 74 is a temperature sensitive element 78 having both luminescent as well as radioactive properties. The temperature sensitive element 78 is attached to the probe end 74 via a clear epoxy 80 and is encapsulated or sheathed by an opaque epoxy layer 82 for preventing extraneous and ambient illumination from affecting the temperature sensitive element 78. Provided proximate the response end 76 of the optical fiber bundle 72 is a detector 84 of the variety described above. A detector circuit 86 is attached to the detector 84 via an appropriate electrical line 88 in much the same manner as previously described in the first and second embodiments. There is no external source associated with the temperature probe embodiment shown in FIG. 3 inasmuch as the radioactive luminescent material utilized in the temperature sensitive element 78 includes its own source of excitation radiation. However, the luminescent material used in the element 78 remains temperature sensitive and will emit luminescent light intensity and/or frequency spectrum dependent upon the temperature it is subjected to. The advantages of using a radioactivated luminescent material as a light source at the temperature sensitive element 78 is that a single optical fiber bundle may be used since the light source is the luminescent material. This eliminates the need for an external light source to excite the luminescent material and also eliminates the problems associated with controlling the excitation source intensity. Using a radioactive luminescent material additionally makes the probe simple and easy to fabricate thereby resulting in a diminished size for delicate temperature sensing.

Figure 4:
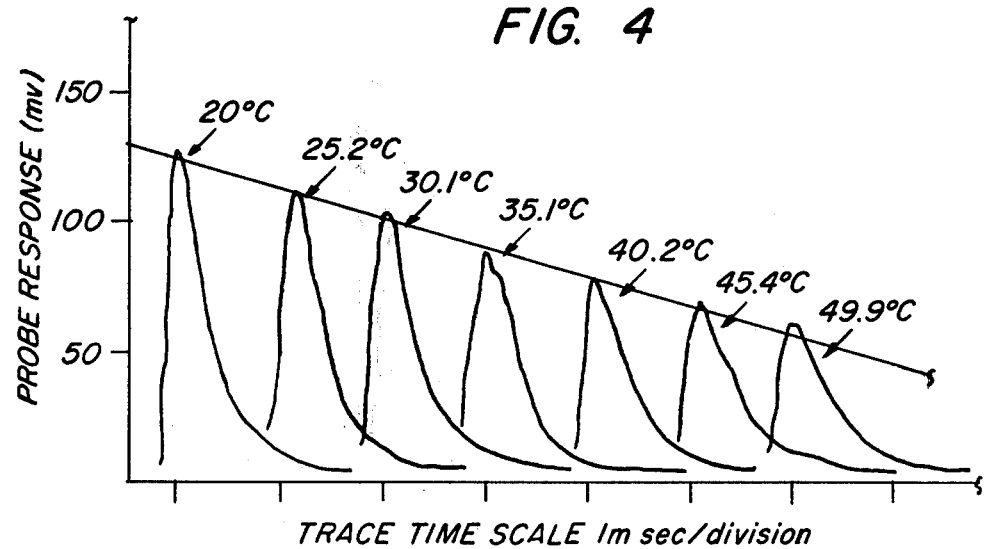
FIG. 4 is a graphic representation of the temperature response of one embodiment of the present invention.

FIG. 4 is indicative of the time response received by the detector from the temperature sensitive element in the embodiments previously discussed. The vertical axis for the family of curves shown in FIG. 4 represents the response in volts per centimeter for a given excitation pulse at different temperatures. As should be evident from a review of the graph in FIG. 4, the voltage representation of the light response for lower temperatures is greater than that for higher temperatures. In this regard, Applicant has determined that the tolerance levels or temperature resolution is in the vicinity of ±0.3° C. thereby providing an accurate measurement of the temperature to which the probe end is subjected. The configuration of each curve of the family of curves in FIG. 4 may be utilized in various ways to determine temperature. For example, the peak response is indicative of a substantially linear decrease with temperature increase. Additionally, the area under each curve may be integrated thereby resulting in an inverse proportional relationship between the area under one curve and its related temperature. The specific shape of the curve and/or its decay time (as is indicated by the curve's tail) may be equally utilized to temperature determination.

In conclusion, it will be seen that there is provided a simple, efficient, and easily maintained temperature probe adapted for primary use in a non-ionizing electromagnetic radiation field. The temperature probe is constructed with non-conductive dialectric materials and therefore is non-interfering and non-perturbing of the electomagnetic field. Additionally, based on the physical phenomena of luminescence, its response will be independent of electromagnetic fields in the radio and microwave frequency range. Using various temperature sensitive elements (luminescent materials of different physical properties), the sensitivity of the temperature probe may be varied to any one of a number of temperature ranges to which the operator will subject the probe.

While certain changes may be made in the above noted apparatus without departing from the scope of the invention herein involved, it is intended that all matter contained in the above description or shown in the accompanying drawings shall be interpreted as illustrative and not in a limiting sense.

I claim:

1. A temperature probe adapted to be implanted in a material whose temperature is to be measured, said temperature probe comprising:

an optical fiber bundle having at least one distinct group of optic fibers for optically conducting light between one end thereof and the other;
a temperature sensitive element located at one end of said optical fiber bundle, said temperature sensitive element having temperature sensitive luminescent properties and being adapted to be implanted in such material whose temperature is to be measured;
means located at one of said optical fiber bundle for exciting said temperature sensitive element; and
light responsive detection means located at the other end of said optical fiber bundle from said temperature sensitive element for detecting light directed from said temperature sensitive element and passed through said optical fiber bundle.

2. A temperature probe adapted to be implanted in a material whose temperature is to be measured, said temperature probe comprising:

an optical fiber bundle having a first group and a second group of optical fibers which are physically separated at one end of said bundle;
a temperature sensitive element having temperature sensitive luminescent properties, said temperature sensitive element being located at the other end of said bundle and being adapted to be implanted in such material whose temperature is to be measured;
light source located proximate said first group of optical fibers at said one end of said bundle, said light from said source optically passing through said first bundle to excite said temperature sensitive element; and
light responsive detection means located proximate said second group of optical fibers at said one end of said bundle, said light emitted from said temperature sensitive element passing through said second bundle to said light responsive detection means.

3. The temperature probe according to claim 2 wherein said temperature sensitive element is a phosphorescent material.

4. The temperature probe according to claim 3 wherein said phosphorescent material is zinc sulfide activated with camdium.

5. The temperature probe according to claim 3 wherein said phosphorescent material is calcium sulfide activated with Europium and tin.

6. The temperature probe according to claim 2 wherein said temperature sensitive element is a phosphorescent material encapsulated in an optically opaque element.

7. The temperature probe according to claim 2 wherein said temperature sensitive element is a phosphorescent material having a luminescent decay time which is temperature dependent.

8. A temperature probe adapted to be implanted in a material whose temperature is to be measured, said temperature probe comprising:

an optical fiber bundle having at least one optical fiber;
a temperature sensitive element having temperature sensitive luminescent properties and having the property of emitting radiation at a different frequency than that it absorbs, said temperature sensitive element being located at one end of said bundle and being adapted to be implanted in such material whose temperature is to be measured;
light source located proximate the other end of said bundle, said light source having a given frequency spectrum;

means proximate said other end for separating the light passed from said source toward said temperature sensitive element from that being emitted from said temperature sensitive element; and light responsive detection means located proximate said other end of said bundle, said light responsive detection means including means for detecting the light emitted from said light sensitive element as a function of the change in temperature of said temperature response element.

9. The temperature probe according to claim 8 wherein said temperature sensitive element is a phosphorescent material.

10. The temperature probe according to claim 9 wherein said phosphorescent material is zinc sulfide activated with camdium.

11. The temperature probe according to claim 9 wherein said phosphorescent material is calcium sulfide activated with Europium and tin.

12. The temperature probe according to claim 8 wherein said temperature sensitive element is a phosphorescent material encapsulated in an optically opaque element.

13. The temperature probe according to claim 8 wherein said temperature sensitive element is a phosphorescent material having a luminescent response which is temperature dependent, said luminescent response being a function of temperature.

14. The temperature probe according to claim 8 wherein said separating means includes a beam splitter and an excitation frequency filter associated with said source and a luminescent response filter associated with said light responsive detection means.

15. A temperature probe adapted to be implanted in a material whose temperature is to be measured, said temperature probe comprising:

an optical bundle having at least one optical fiber;
a temperature sensitive element having temperature sensitive luminescent properties, said temperature sensitive element being radioactive and being located at one end of said bundle and being adapted to be implanted in such material whose temperature is to be measured;

a radioactive source located proximate said temperature sensitive element for exciting said temperature sensitive element; and light responsive detection means located proximate the other end of said bundle for detecting the emission response of said temperature sensitive element as a function of its temperature.

16. The temperature probe according to claim 15 wherein said temperature sensitive element is a phosphorescent material.

17. The temperature probe according to claim 16 wherein said phosphorescent material is zinc sulfide activated with camdium.

18. The temperature probe according to claim 16 wherein said phosphorescent material is calcium sulfide activated with Europium and tin.

19. The temperature probe according to claim 16 wherein said temperature sensitive element is a phosphorescent material encapsulated in an optically opaque element.

20. A temperature probe adapted to be implanted in a material whose temperature is to be measured, said temperature probe comprising:

an optical bundle having at least one optical fiber;
a temperature sensitive element having radioactive and luminescent temperature sensitive properties, said temperature sensitive element being located at one end of said bundle and being adapted to be implanted in such material whose temperature is to be measured;

light responsive detection means located proximate the other end of said bundle for detecting the emission response of said temperature sensitive element as a function of its temperature.

21. The temperature probe according to claim 20 wherein said temperature sensitive element is a radioactivated phosphorescent material.

22. The temperature probe according to claim 21 wherein said radioactivated phosphorescent material is zinc sulfide activated with camdium.

23. The temperature probe according to claim 21 wherein said phosphorescent material is calcium sulfide activated with Europium and tin.

24. The temperature probe according to claim 20 wherein said temperature sensitive element is a radioactivated phosphorescent material encapsulated in an optically opaque element.

* * * * *

Notice of Adverse Decision in Interference

In Interference No. 100,854, involving Patent No. 4,245,507, T. V. Samulski, TEMPERATURE PROBE, final judgment adverse to the patentee was rendered July 1, 1982, as to claims 1, 2, 8, 15 and 20.

[*Official Gazette October 19, 1982.*]